United States Patent [19]

Noda

[11] Patent Number: 6,160,968
[45] Date of Patent: ***Dec. 12, 2000

[54] PRINTING METHOD AND IMAGE PROCESSING METHOD FOR PERFORMING PRINTING DURING WHICH CALIBRATION OF PRINTING APPARATUS IS EXECUTED

[75] Inventor: Akihiko Noda, Hino, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 09/198,441

[22] Filed: Nov. 24, 1998

[30] Foreign Application Priority Data

Nov. 28, 1997 [JP] Japan ..................................... 9-328694

[51] Int. Cl.$^7$ ................................................. G03G 15/00
[52] U.S. Cl. .............................. 399/8; 358/518; 358/523; 399/39; 399/75
[58] Field of Search .................................... 399/75, 9, 38, 399/8, 54, 82, 39; 358/518, 519, 523; 382/167

[56] References Cited

U.S. PATENT DOCUMENTS 5,844,542  12/1998  Inoue et al. ......................... 358/518 X
5,950,036   9/1999  Konishi ..................................... 399/8

*Primary Examiner*—Matthew S. Smith
*Attorney, Agent, or Firm*—Fitzpatrick, Cella, Harper & Scinto

[57] ABSTRACT

When data of one page is output for a predetermined amount, the host unit performs division of the printing data into a plurality of divided jobs a predetermined calibration on the basis of the calibration execution. For every divided job, the most recent calibration information from a printer-side is obtained. On the basis of the obtained calibration information, a density correction value of a γ correction table is updated. Then, the γ correction table performed calibration is used for performing printing of the divided jobs. By this, the printing apparatus performs a printing operation according to the printing job output from the host unit to enable appropriate calibration when a large amount is printed for the same information.

25 Claims, 16 Drawing Sheets

| JOB NO. | 1 | 2 | 3 | 4 | 5 |
|---|---|---|---|---|---|
| COPY NUMBER INFORMATION | 200 | 200 | 200 | 200 | 100 |

*FIG.12*

CALIBRATION INFORMATION

| ID | ACTUAL DENSITY VALUE |
|---|---|
|    | (INPUT VALUE FROM PRINTER) |
| I1 | D1 |
| I2 | D2 |
| I3 | D3 |
| I4 | D4 |
| I5 | D5 |

*FIG.13*

CORRECTION TABLE

| ID | THEORETICAL DENSITY VALUE (OUTPUT VALUE TO PRINTER) | ACTUAL DENSITY VALUE (INPUT VALUE FROM PRINTER) | DENSITY CORRECTION VALUE |
|---|---|---|---|
| I1 | 10% | D1 | 10/D1 |
| I2 | 30% | D2 | 30/D2 |
| I3 | 50% | D3 | 50/D3 |
| I4 | 70% | D4 | 70/D4 |
| I5 | 100% | D5 | 100/D5 |

*FIG.15*

| TIME | USER NAME | FILE SIZE/NUMBER OF COPIES | EXECUTION TIMING/DENSITY VARIATION AMOUNT |
|---|---|---|---|
| 10:10:10AM | Mr.A | 1230KB/450 | "200"COPIES/10% |
| 11:11:11AM | Mr.A | 2300KB/850 | "140"COPIES/16% |
| 12:12:12AM | Mr.C | 2310KB/630 | "220"COPIES/13% |
| 12:20:22AM | Mr.C | 2310KB/630 | "220"COPIES/13% |

CALIBRATION EXECUTION TIMING:

⦿ EVERY [250] COPIES OF OUTPUTS

○ WHEN DENSITY VARIATION AMOUNT (δ) IS GREATER THAN OR EQUAL TO [20]%

OK

CANCEL

FIG.17

PRINTING METHOD AND IMAGE PROCESSING METHOD FOR PERFORMING PRINTING DURING WHICH CALIBRATION OF PRINTING APPARATUS IS EXECUTED

This application is based on Patent Application No. 328,694/1997 filed on Nov. 28, 1997 in Japan, the content of which is incorporated hereinto by reference.

BACKGROUND OF THE INVENTION

FIELD OF THE INVENTION

The present invention relates to an information processing system, a printing method and an image processing method. More particularly, the invention relates to a calibration in a printing apparatus.

DESCRIPTION OF THE RELATED ART

A printing apparatus has been widely used as a device for outputting image information and so on in an information processing system. As such printing apparatus, for example, an electrophotographic type printing apparatus hereinafter simply referred to as a printer employs a laser beam to perform formation of a visual image by fixing a toner on a paper. On the other hand, an ink-jet type printing apparatus, such as a bubble-jet type or the like, performs formation of a visual image by ejecting an ink toward a paper. These printing processes or printing mechanisms are becoming more and more complicated for the increase of resolution and color printing of the printer in the recent years.

In such a printer, it is possible to cause variation in electrical and mechanical conditions for printing upon formation of the visual image due to a fluctuation of a printing environment, wearing of respective parts of the printer and so on and thereby to cause a variation in the visual image to be formed. It is well known that density or tone of the printed image, and, a color tone in a color image are typical variations in the visual image.

In order to take a measure of such variation in the printed image, a correction process for a γ correction table, namely a process called a calibration, has been executed, conventionally. Such calibration is performed in a following manner, in an information processing system constructed with a host system, a printer and so on.

As a first example, in the case that printing data is transmitted to the printer in a form of a printing job described by a page description language (hereinafter occasionally referred to as "PDL"), the calibration is not performed in a host device (hereinafter occasionally referred to as "host"), and a controller portion of the printer receives a demand for calibration from an engine portion of the printer at a predetermined timing to update the correction table to perform calibration. Then, subsequently, at a time of reception of a printing job, correction of image data (the printing job) is performed with a new correction table in the control portion.

As a second example, when the printing data is transmitted to the printer in a form of the printing job, in which all of the printing data is binarized, a host 10 processing the printing data and the printer are connected in a mode capable of two-way communication, as shown in FIGS. 1 and 2. Then, at every printing job, the host obtains calibration information from the printer to generate a new correction table on a basis of the obtained calibration information to perform calibration, and the corrected image data (printing job) can be generated by using the new correction table.

However, in the foregoing second example in the prior art, since the calibration is executed for each printing job, when the same information is printed in a large amount, prevention of degradation of the image quality may be difficult.

For example, as shown in FIG. 2, when the printing job involves outputting nine hundred copies of one page of data, at first, upon initiation of printing, patch printing is performed in the printer 20 on a basis of theoretical density values of k-levels of tones. And a printing condition, which is expressed as an actual density values, is derived by measurement of a patch to be outputted to the host 10 as the calibration information. The host 10 updates density correction values in the correction table on a basis of the thus output calibration information to perform the calibration. Then, the printing job, in which the printing data is corrected with reference to the new correction table, is generated.

Then, in printing which is performed on a basis of this printing job, the variation in a printing condition will not occur or will be small or non-existent for a condition where number of copies of print is small immediately after initiation of printing, e.g. at printing of first to thirtieth copies.

Further, the calibration is effective even when the printing job generated with reference to the printing condition upon initiation of printing, is used, to obtain an output result without any degradation of printing quality. However, according to an increase of the number of outputs, the printing condition may vary to cause a difference between a correction amount to be actually provided for the printing job and a correction amount provided for the printing job upon initiation of the printing in accordance with the calibration. As a result of this, in the condition where number of copies of print is large close to an end of printing, e.g. seven hundredth to eight hundred fiftieth copies, the difference becomes significant, and thus the difference of the correction amount becomes clearly perceptible in the result of output.

Naturally, it is desirable that the printing quality of the output result of the first copy at the beginning of printing and the output result of the nine hundredth copy as a final copy are the same as shown in FIG. 4. However, the output results may vary in proportion to an increasing number copies of printing, for example, to finally cause the significant variation of the qualities of outputs between the first copy and the nine hundredth, as shown in FIG. 3.

In contrast to this, it may be taken into consideration that a user of the printer intentionally divides the number of printing copies to generate the printing jobs for a plurality of times. For example, printing of data for one page for three hundred copies is repeated three times to avoid degradation of printing quality. However, it is not so easy to correctly recognize the variation in the condition of the printer for each derived number of copies, preliminarily. Further, it is not easy to make a judgment as to how many copies would be appropriate in one printing job. It may be also considered that the variation in the condition of the printer is actually checked per every preliminarily divided number of copies to reflect the result of correction in each printing job. However, even in this case, since the condition of the printer has to be checked preliminarily, efficiency in use of time can be lowered. Also, it is less economical to require unnecessary output.

Furthermore, in the case that nine hundred copies are printed for data of one page in the above-stated first example of the calibration, once printing is initiated, the printer continues the printing operation until completion of nine hundred copies of printing. Therefore, even when the printer per se attempts to perform calibration, there is no chance to perform the calibration.

SUMMARY OF THE INVENTION

An object of the present invention is to provide an information processing system, a printing method and an image processing method which does not cause degradation of print quality of output by appropriately performing calibration even when large amount of printing is performed for the same information.

Another object of the present invention is to provide an information processing system, a printing method and an image processing method which can execute calibration at an appropriate time.

A further object of the present invention is to provide an information processing system, a printing method and an image processing method which can automatically perform calibration per every divided printing job during printing in the case where the printing job is to perform printing in large amount for the same data by performing calibration of the correction data using the most recent calibration information at every transfer of divided printing job.

In a first aspect of the present invention, there is provided a printing method of performing printing by using a printing apparatus connected to a host unit, on a basis of a printing data corrected by a correction data, the method comprising the steps of:

dividing a printing job containing printing data into a plurality of divided jobs on a basis of a predetermined printing amount in the printing apparatus and sequentially transferring the plurality of divided jobs from the host unit to the printing apparatus;

updating the correction data for each transfer of a divided job, on a basis of most recent calibration information which the printing apparatus has;

correcting the printing data of each divided job on a basis of the updated correction data; and performing printing of each divided job on a basis of the corrected printing data.

In a second aspect of the present invention, there is provided an image processing method used in an image processing portion which performs a color correction of image data depending upon a set color correction condition to output the image data to an image output portion, the method comprising the steps of:

inputting state information from the image output portion;

setting calibration execution timing on a basis of the state information;

performing a calibration process in the image output portion at the set execution timing; and setting the color correction condition by inputting a result of the calibration process from the image output portion.

In a third aspect of the present invention, there is provided an image processing method comprising the steps of:

inputting an image output job;

dividing the image output job into a plurality of image output jobs depending upon a number of copies of image outputs; and designating a calibration to an image output portion in response to finishing of performing each divided image output job.

In a fourth aspect of the present invention, there is provided an image processing method comprising the steps of:

setting an interval of execution of calibrations; and designating execution of a calibration process for an image output portion depending upon the calibration execution interval in execution of calibrations.

In a fifth aspect of the present invention, there is provided an information processing system having a host unit and making a printing apparatus connected to the host unit perform on a basis of a printing data corrected by correction data, for the system comprising:

job dividing means for dividing a printing job containing printing data into a plurality of divided jobs on a basis of a predetermined printing amount in the printing apparatus and for sequentially transferring the divided jobs from the host unit to send to the printing apparatus;

calibration means for updating the correction data for each transferring of divided job, on a basis of the most recent calibration information which the printing apparatus has; and printing data correcting means for correcting the printing data of each divided job on a basis of the updated correction data by the calibration means.

The above and other objects, effects, features and advantages of the present invention will become more apparent from the following description of embodiments thereof taken in conjunction with the accompanying drawings.

BRIEF DESCRIPTION OF THE DRAWINGS

FIG. 12 is an illustration showing an example of a job management table in the shown embodiment;

FIG. 13 is an illustration showing an example of a calibration information relating to the shown embodiment;

FIG. 15 is an illustration showing an example of a density correction table in the shown embodiment;

FIG. 17 is an illustration showing an example of a display of the user interface in an embodiment of the present invention.

DESCRIPTION OF THE PREFERRED EMBODIMENT

An embodiment of the present invention will be explained hereinafter in detail with reference to the drawings.

First Embodiment

Figure 1:
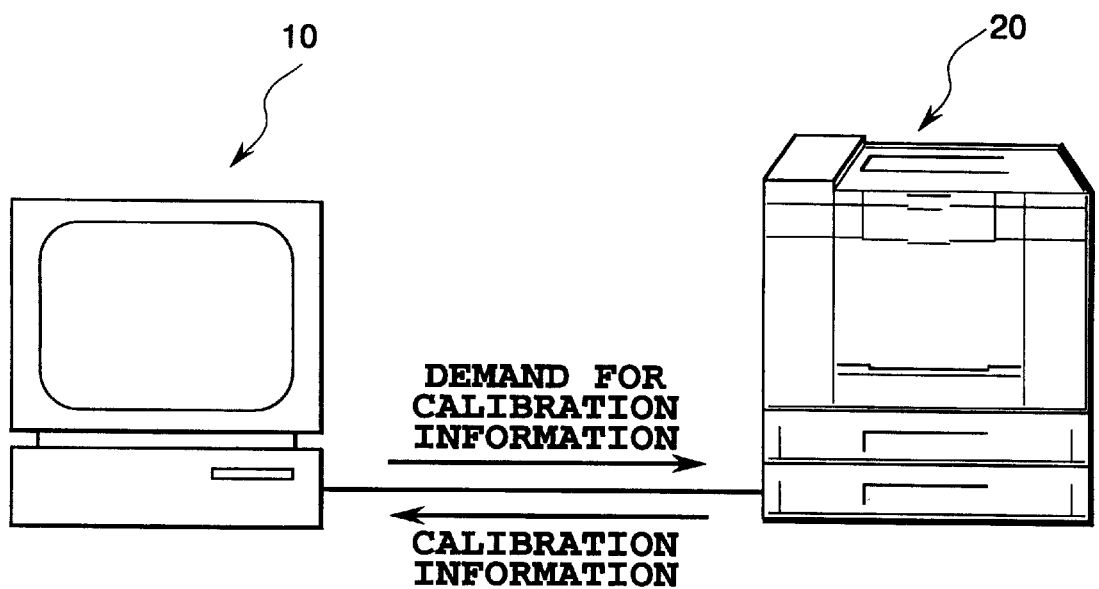
FIG. 1 is a conceptual illustration showing a two-way communication between a host device and a printer.
Figure 2:
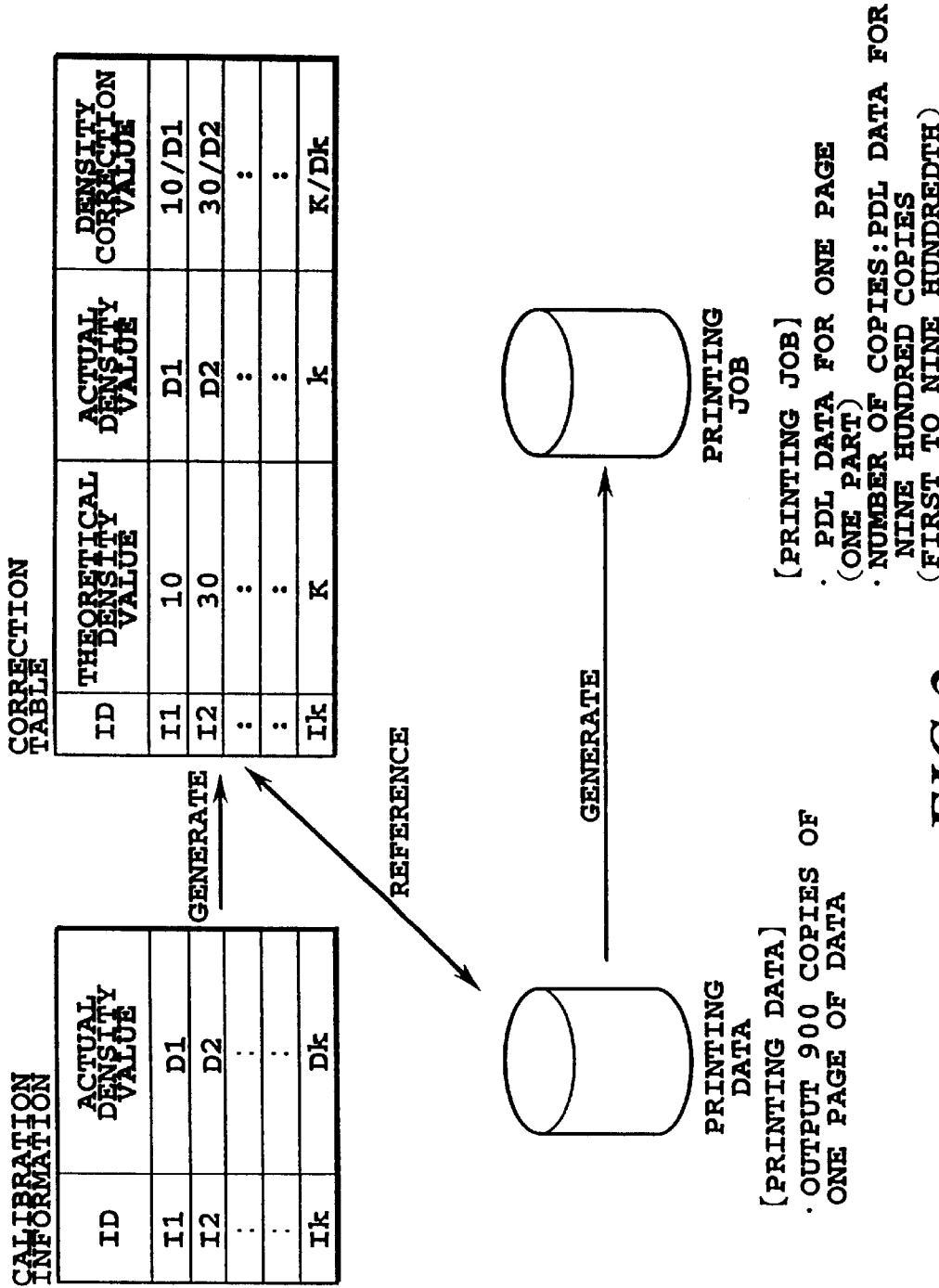
FIG. 2 is a conceptual illustration for explaining generation of a calibration and a printing job in the prior art.
Figure 5:
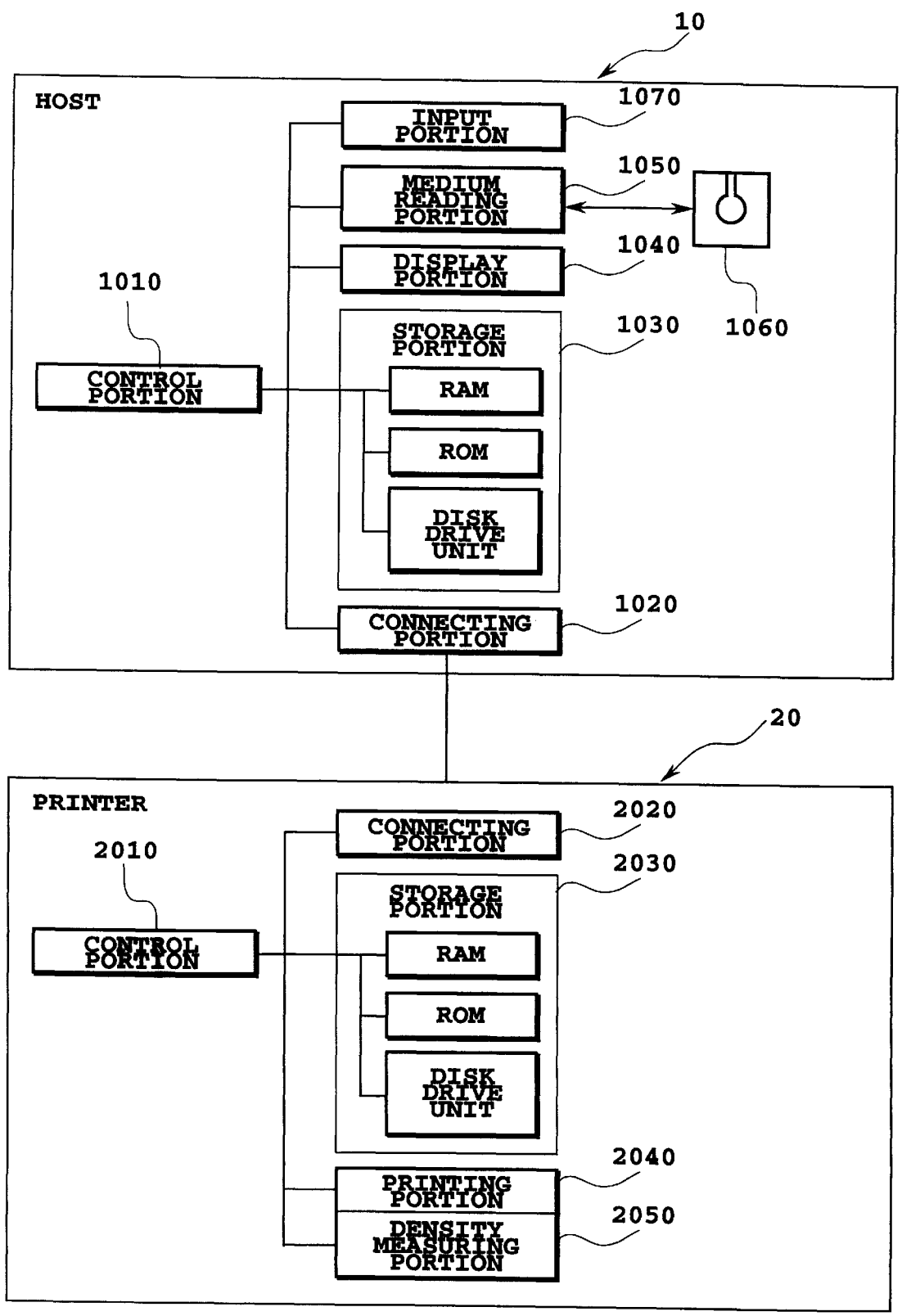
FIG. 5 is a block diagram showing a construction of an embodiment of an information processing system according to the present invention.

The shown embodiment is premised on a construction similar to that of FIG. 1, and the present invention is applied to an information processing system shown in FIG. 1. FIG. 5 is a block diagram showing a construction of a host 10 and a printer 20 shown in FIG. 1.

As shown in FIG. 1, the host 10 is implemented in a form of a personal computer. On the other hand, the printer 20 is implemented as an electrophotographic printing apparatus using a laser beam. The host 10 includes a control portion 1010 which has a CPU for executing overall process in the host system, a storage portion 1030 storing data used in execution of the process in the control portion 1010 and being used as a work area, a display portion 1040 having a CRT or the like, an input portion 1070 having a keyboard or the like, and a media reading portion 1050 for reading a stored data of a floppy disk 1060 as a storage medium. On the other hand, the printer 20 has a control portion 2010 and a storage portion 2030 similarly. Further, the printer 20 has a printing portion 2040. The printing portion 2040 has a photosensitive drum and a laser beam system for forming a latent image on the photosensitive drum, a developing portion applying toners of respective colors to the latent image formed on the photosensitive drum, and a transfer portion transferring a toner image on the photosensitive drum to a printing paper.

Furthermore, in the printing portion 2040, a density measuring portion 2050 for obtaining an actual density value of the printer to be used as a calibration information, is provided. More specifically, the density measuring portion 2050 has a reading sensor for measuring a density of the toner image formed on the photosensitive drum. When the calibration information is generated by using the density measuring portion 2050, at first, the latent images of patch images are formed for each of density stages and for each toner color of yellow, magenta, cyan and black on the photosensitive drum by a laser beam system, and subsequently a toner image is formed by further applying toner on the latent images. Then, the actual density value of every toner color, namely the calibration information, can be obtained by reading the toner image by the reading sensor, as will be explained in connection with FIG. 6.

It should be noted that exchange of information or data between the host 10 and the printer 20 is performed through a connecting portion 1020 and a connecting portion 2020 each respectively having an interface.

The printer 20 holds state information indicative whether the printer is currently in a condition requiring calibration or not, in a RAM for answering to a demand relating to the calibration from the host 10. The state information will be explained later in connection with the process shown in FIG. 7 and can be an accumulated period of use from initiation of use of the printer, a varying ratio of the calibration information and so on. Further, the printer 20 generates the calibration information at a predetermined timing and holds it in RAM of the storage portion 2030, so that the printer 20 can provide the calibration information in response to a demand from the host which uses the calibration information for a correction process of the print data.

In the printer 20, a timing to generate the calibration information is determined independently on the side of the printer. It is generated upon turning ON of the power source of the printer, every printing of predetermined number of copies, for example, fifty or one hundred copies, and further upon exchanging of toner or the like. The most recent calibration information generated in these timings or the most recent calibration information and information on the previously generated two or three calibrations are held in RAM of the storage portion 2030.

Figure 6:
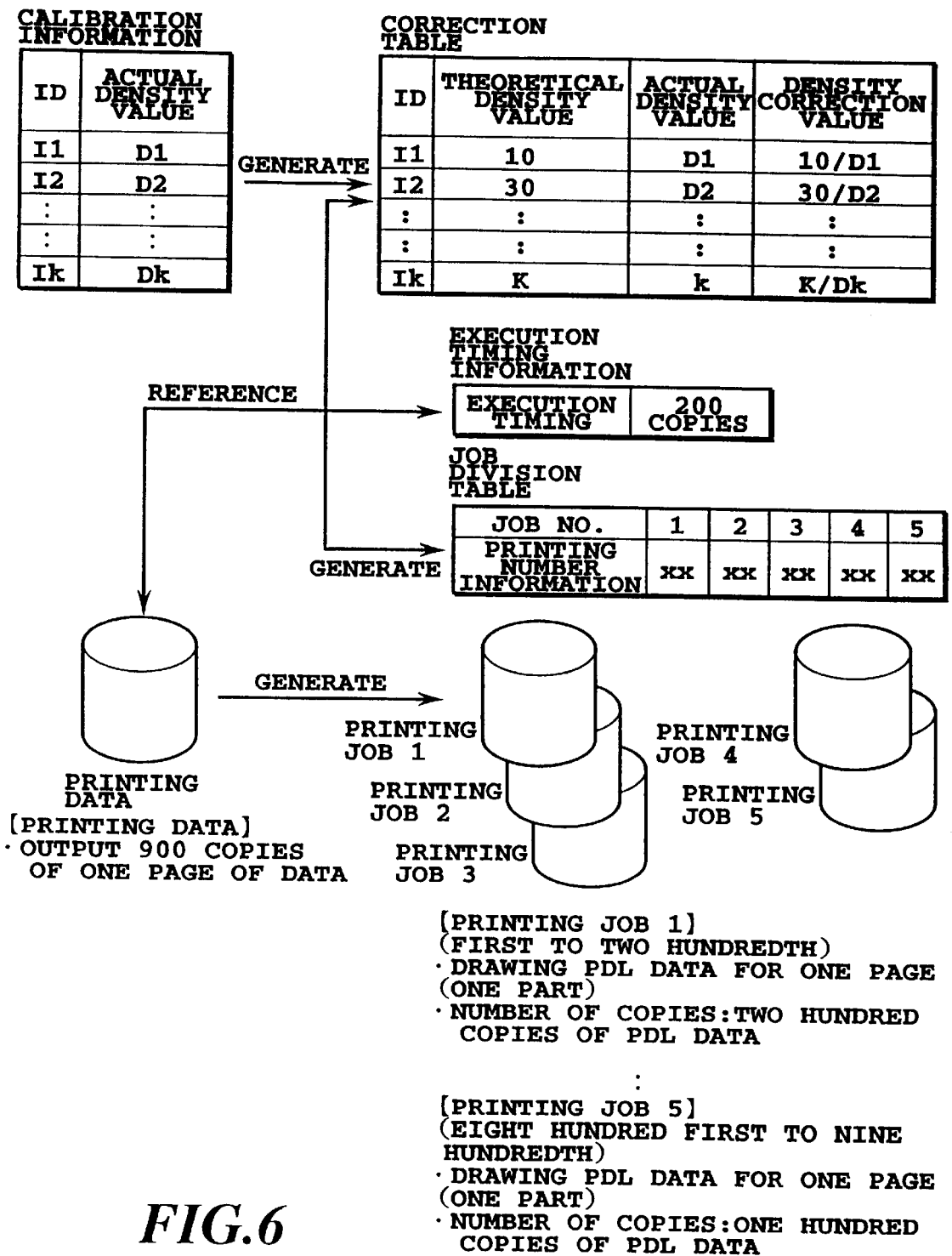
FIG. 6 is a conceptual illustration for explaining the calibration and the printing job in an embodiment of the present invention.

In the shown embodiment, generation of the calibration information is performed by forming the toner image of a predetermined patch on the photosensitive drum by operating the printing portion 2040, reading the toner image by the density measuring portion 2050, and obtaining the actual density value of k-levels (5 levels in the shown embodiment) for each output color as shown in FIG. 6.

On the other hand, in RAM of the storage portion 1030 of the host 10, an execution timing information is stored as shown in FIG. 6. The execution timing information indicates a timing of calibration for the printer connected thereto, independently on the side of the host. In the shown embodiment, as shown in FIG. 6, the information is stored in order to perform calibration for each of two hundred copies of printing.

Figure 7:
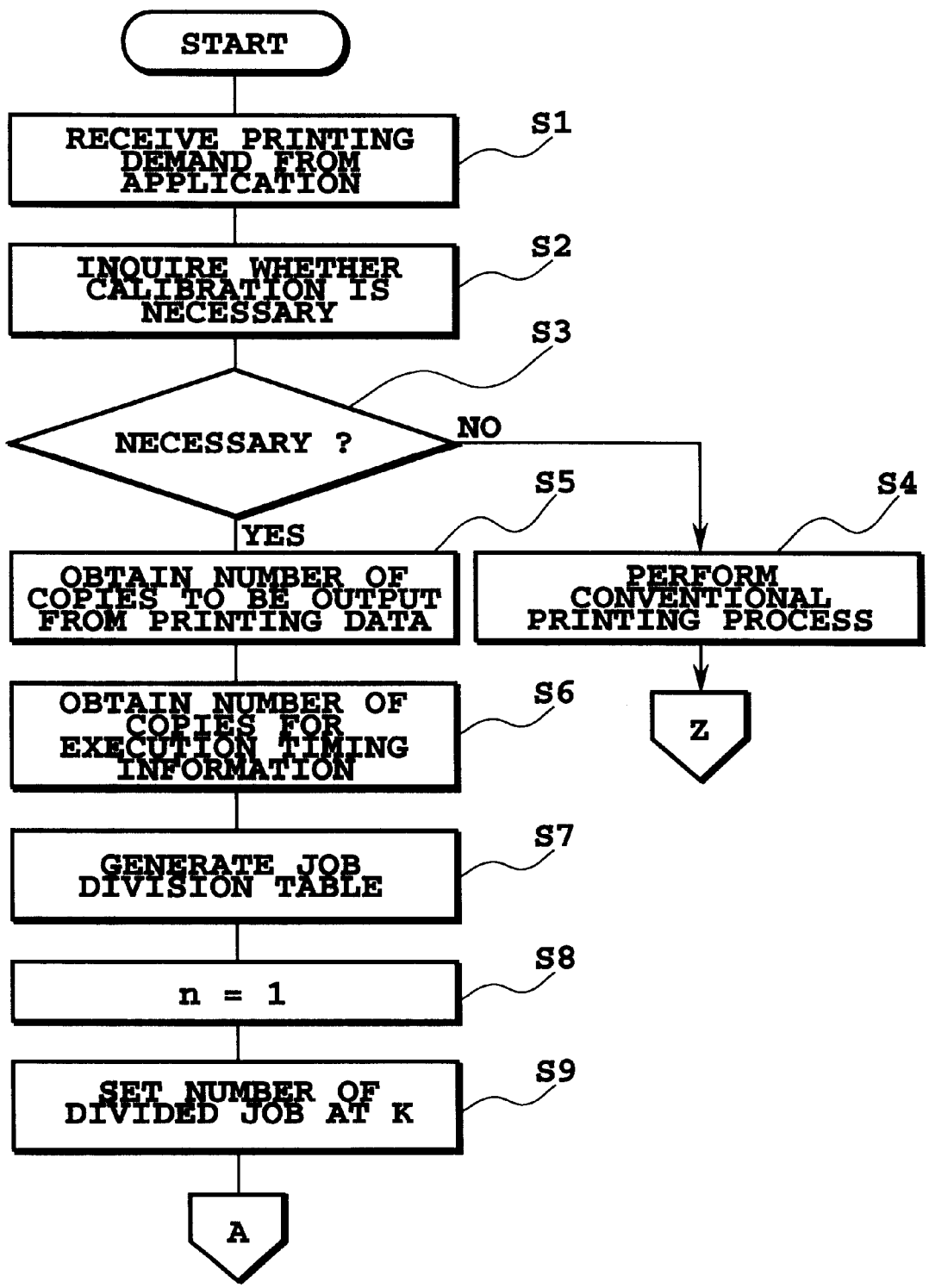
FIG. 7 is a flowchart showing a print control, particularly the calibration in an embodiment of the present invention.
Figure 8:
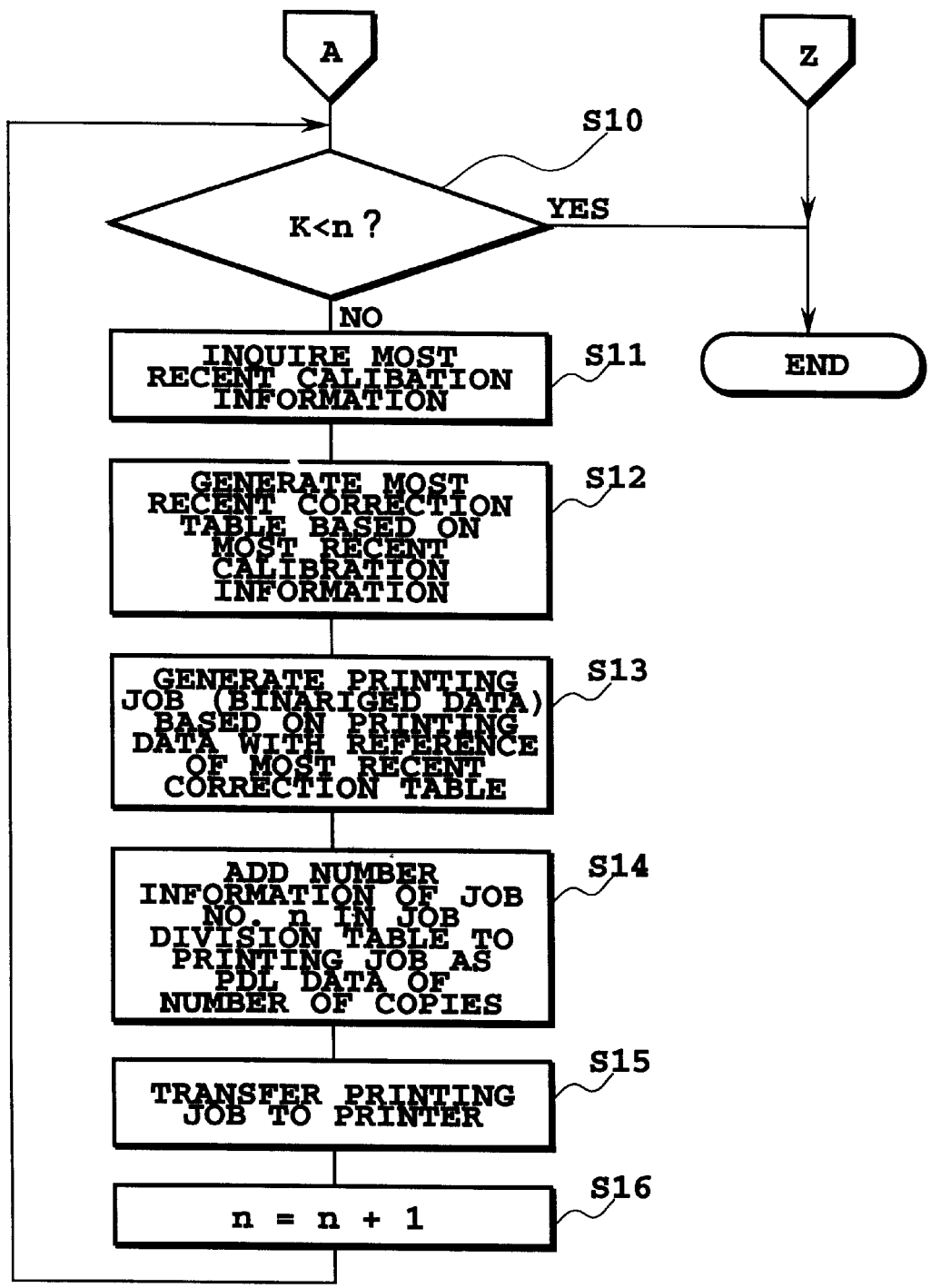
FIG. 8 is a flowchart showing a print control, particularly the calibration in an embodiment of the present invention.

Further, in a hard disk unit of the storage portion 1030 of the host 10, a module relating to a process which will be explained with respect to FIGS. 7 and 8, is stored. The module is read and stored into RAM of the storage portion 1030 of the host upon timing of initiation of the host 10, and is executed.

Figure 10:
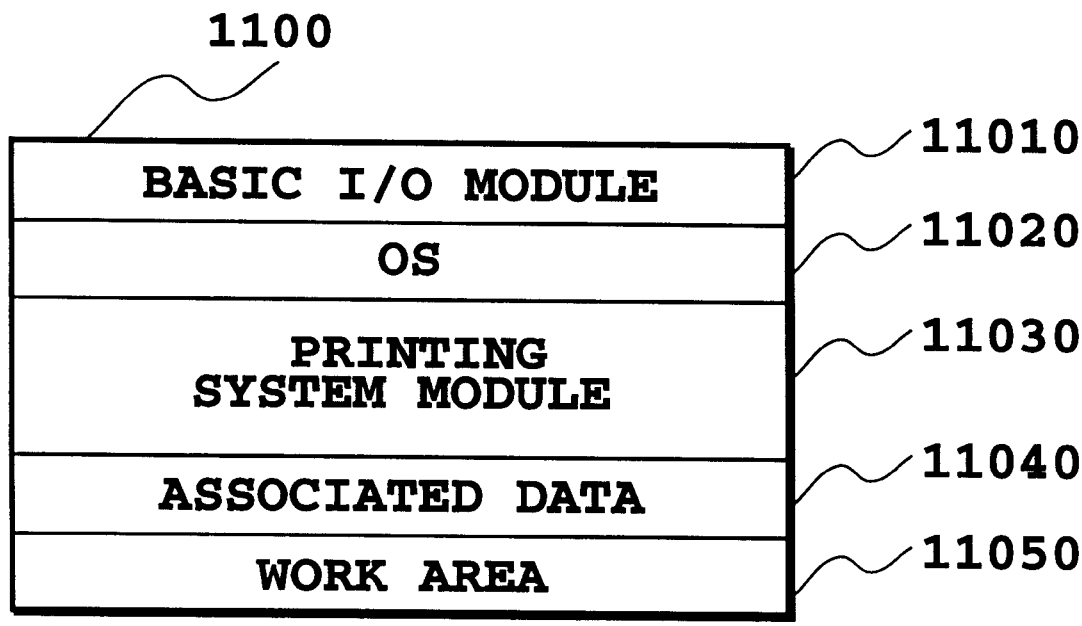
FIG. 10 is a chart showing a memory map when the module is in operation.
Figure 11:
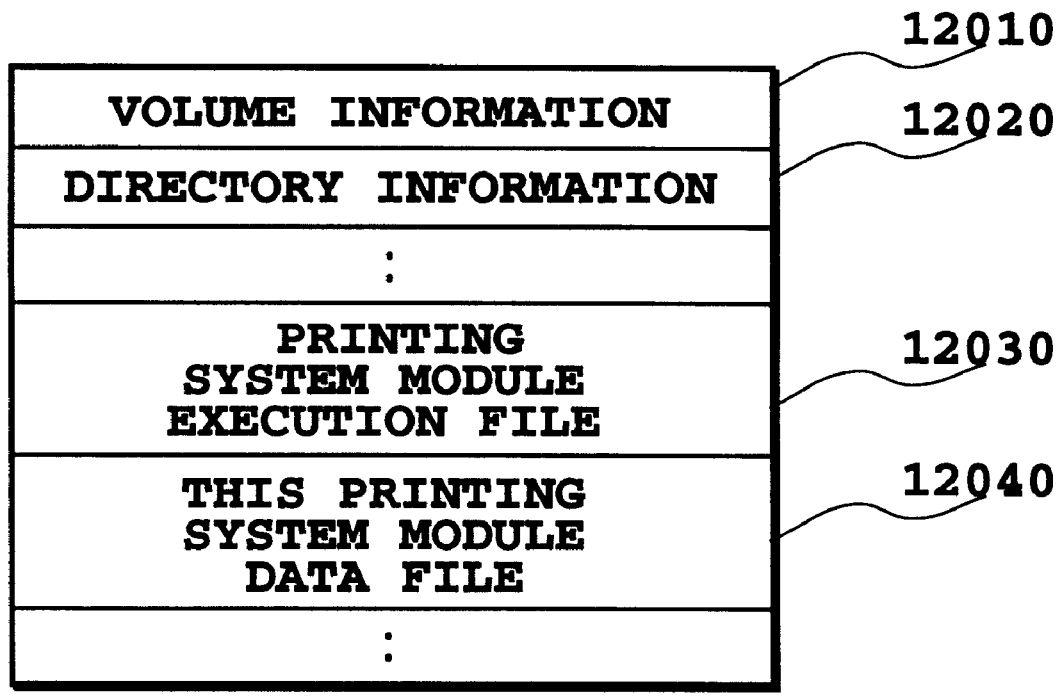
FIG. 11 is an illustration showing a structure of the storage medium, in which the module is stored.

In addition to this, it should be noted that, the foregoing module and the associated data may be loaded via the medium reading portion 1050 of the host 10, and the module may be executed. For example, the module and the associated data are stored in a storage medium 1060 shown in FIG. 9. The content stored in the storage medium 1060 has a structure shown in FIG. 11. In this case, the module and associated data realizing the processing procedure of the shown embodiment and stored in the storage medium 1060, can be loaded to the host 10 via the medium reading portion 1050 shown in FIG. 9. More specifically, the when the storage medium 1060 is set in the medium reading portion 1050, the module and the associated data are read from the storage medium 1060 under control of OS (operating system) and a basic I/O program and are loaded to RAM of the storage portion 1030 of the host 10 to enable an operation. FIG. 10 shows a memory map in a state where the module is loaded in RAM of the storage portion of the host and enabled for operation.

Figure 9:
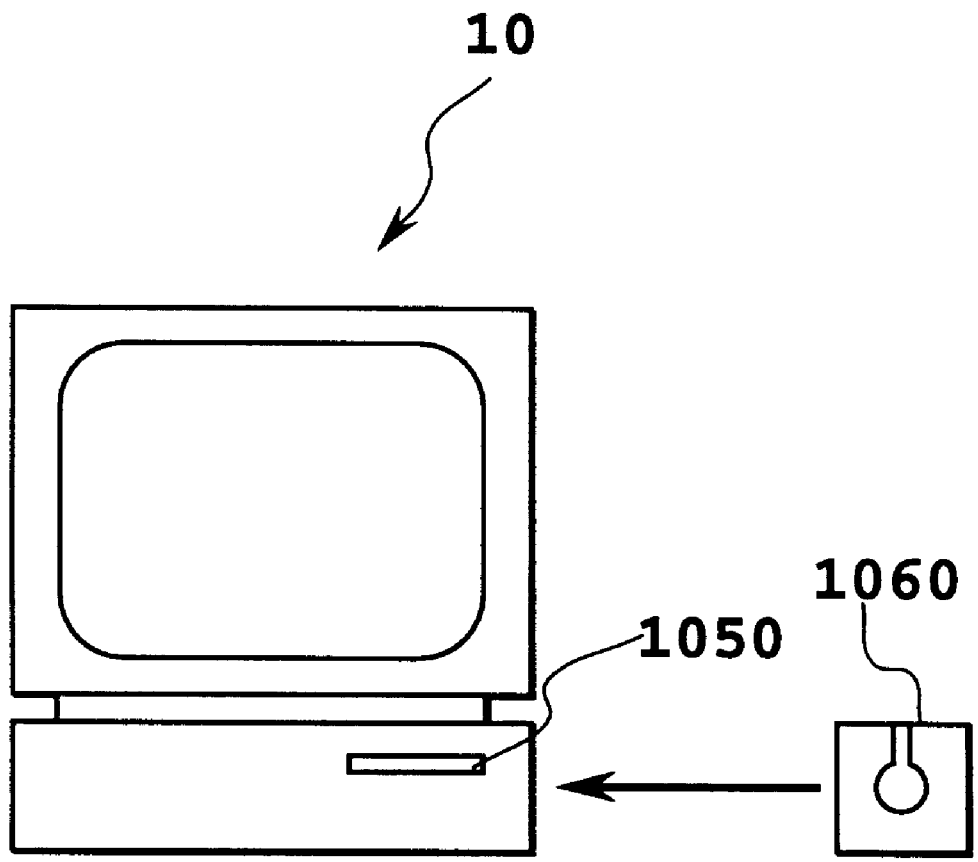
FIG. 9 is an illustration showing that a module is supplied from a storage medium storing the module to a host in an embodiment of the present invention.

Furthermore, the module and the associated data relating to the process procedure of the shown embodiment stored in the storage medium 1060 shown in FIG. 9 may be temporarily stored (installed) in a disk unit or the like of the storage portion 1030 of the host 10 so that the module and the associated data is read from the disk unit or the like and is located into RAM of the storage portion 1030 when using the module and the associated data.

It should be noted that the foregoing module of the shown embodiment is implemented in a form of program code coded on a basis of the flowcharts shown in FIGS. 7 and 8.

A printing process, particularly a calibration based on the construction of the shown embodiment set forth above will be explained with reference to FIG. 6 and the flowcharts shown in FIGS. 7 and 8.

At first, the control portion 1010 of the host is initiated to operate the printing process for receiving a printing demand from an application software (hereinafter also referred to as "application") and begins to perform a process for printing (step S1 of FIG. 7; hereinafter referred to only by the step number). In the shown embodiment, the control portion 1010 obtains a printing data for one page (a printing data for outputting nine hundred copies) shown in FIG. 6 from the operating system (OS) or the application and temporarily stores in the disk unit of the storage portion 1030. It should be noted that, in place of the construction set forth above, the printing data may be obtained from OS or the application at the time when the printing data is required.

Next, the control portion 1010 inquires whether the printer at that time is in a condition that the calibration is needed or not of the control portion 2010 of the printer via the connecting portion 1020 of the host 10 and the connecting portion 2020 of the printer (step S2). In response to this inquiry, the control portion 2010 of the printer obtains state information of the printer at that time stored in RAM of the storage portion 2030 of the printer, namely the information as to whether the calibration is necessary or not, and sends the obtained state information to the control portion 1010 of the host 10 as an answer to the inquiry. In the shown embodiment, as the state information, a ratio of variation of the calibration information (actual density value) in relation to an accumulated period of use of the printer and number of printed copies is used as set forth above. When values of this information falls within a predetermined range, for example, the printer is new and printing quality is not varied significantly, it can be judged that the calibration is unnecessary.

The control portion 1010 checks the state information obtained from the control portion 2010 of the printer to make the judgment of whether the calibration is necessary or not (step S3). When judgment is made that "calibration is unnecessary" on a basis of the information obtained at step S2, the control portion 1010 performs execution of a process in order to perform a conventional printing process (step S4). The conventional printing process represents a mode to generate a printing job without dividing a job and to transfer the generated printing job to the printer. By this arrangement, when the printer per se is new and no perceptible variation is caused in the printing quality, lowering of throughput in certain extent inherently caused by division of the job, can be prevented.

On the other hand, when the judgment is made that as "calibration is necessary" on the basis of the information obtained at step S2, the control portion 1010 checks the printing data stored in the disk unit of the storage portion 1030 to obtain information of the number of output copies and stores the information in RAM of the storage portion 1030 (step S5). In the shown embodiment, as shown in FIG. 6, the information of number of output copies of the printing data is nine hundred.

Next, the control portion 1010 checks a content of RAM of the storage portion 1030 to obtain information indicative of number of copies representative of execution timing for the calibration to store the information in another portion of RAM of the storage portion 1030 (step S6). In the shown embodiment, as shown in FIG. 6, the information indicative of the number of copies indicative of the execution timing is two hundreds. The execution timing information is preliminarily set as a standard value, in the printer.

The control portion 1010 generates the job dividing table shown in FIG. 6, on a basis of the information of the number of output copies stored in RAM and the information of the number of copies indicative of the execution timing, and stores thus generated job dividing table in RAM of the storage portion 1030.

FIG. 12 is a diagrammatic illustration showing a detail of the foregoing job dividing table which show the table generated on a basis of the information where information of the number of output copies is nine hundred and number of copies indicative of the execution timing is two hundred. More specifically, at first, the job is divided into five jobs. The first job (job No. 1 in FIG. 12) to the fourth job (job No. 4 in FIG. 12) are set at two hundred copies as a unit to perform calibration and represent number of copies of each job, and fifth job (job No. 5 in FIG. 12) is set at one hundred of copies as remaining number of copies.

Next, at step S8, a counter n for counting number of jobs which have already been processed for printing in steps subsequent to this step, is set at one as an initial value. Further, at step S9, a parameter K used for making a judgment as to whether the counter value n reaches the number of divided jobs or not, is set at five which represents the number of divisions of the job dividing table. The set values of the counter n and the parameter K are stored in RAM of the storage portion 1030.

At step S10, the foregoing K and n are compared to each other for making the judgment as to whether the content of the counter n reaches five, the content of K. If n does not reach five, the process is advanced to a process of step S11 and subsequent steps in order to execute the divided printing job indicated by the content of the counter n.

At step S11, the control portion 1010 inquires the latest calibration information to the control portion 2010 of the printer through the connecting portion 1020 and the connecting portion 2020. In response to this inquiry, the control portion 2010 of the printer obtains the most recent calibration information (see FIG. 6) stored in RAM of the storage portion 2030 of the printer. The most recent calibration information is generated at a predetermined timing, such as upon finishing of printing for the set predetermined number of copies, as set forth above. The control portion 2010, then sends back the obtained calibration information to the control portion 1010 of the host 10. Then, the control portion 1010 stores the calibration information obtained from the printer side in RAM of the storage portion 1030 in a data format shown in FIG. 13.

It should be noted that when a timing of generation of the calibration information is preliminarily set to perform every fifty copies of printing on the printer-side, and, on the other hand, the timing for executing calibration is set at every two hundred copies of printing as number of copies to print in each divided job, on the host-side, calibration is executed in the printer-side simultaneously with issuing an inquiry for the calibration information to the printer-side at the execution timing determined by the host-side. More specifically, the calibration is executed not only at a calibration timing set by the divided job executed on the host-side depending upon the state information of the printer representing necessity of calibration but also at the unique timing determined on the printer-side. In short, the calibration can be executed at the most appropriate timing.

The calibration information shown in FIG. 13 consists of so-called theoretical density values and the actual density value in a γ-correction curve, in which five density points respectively corresponding to theoretical density values of 10% (I1), 30% (I2), 50% (I3), 70% (I4) and 100% (I5) are taken as measuring points. More specifically, as set forth above, on the printer-side, patches are output with respect to five density points to measure the densities thereof to obtain corresponding actual density values. It is matter of course to vary measuring point positions depending upon characteristics and so forth of the printer to be used and to use the calibration information, in which number of measuring points is increased or decreased.

When the calibration information is obtained from the printer, the control portion 1010 checks the most recent calibration information stored in the storage portion as shown in FIG. 6, at step S12, and generates the most recent correction table to store it in RAM of the storage portion 1030.

Figure 14:
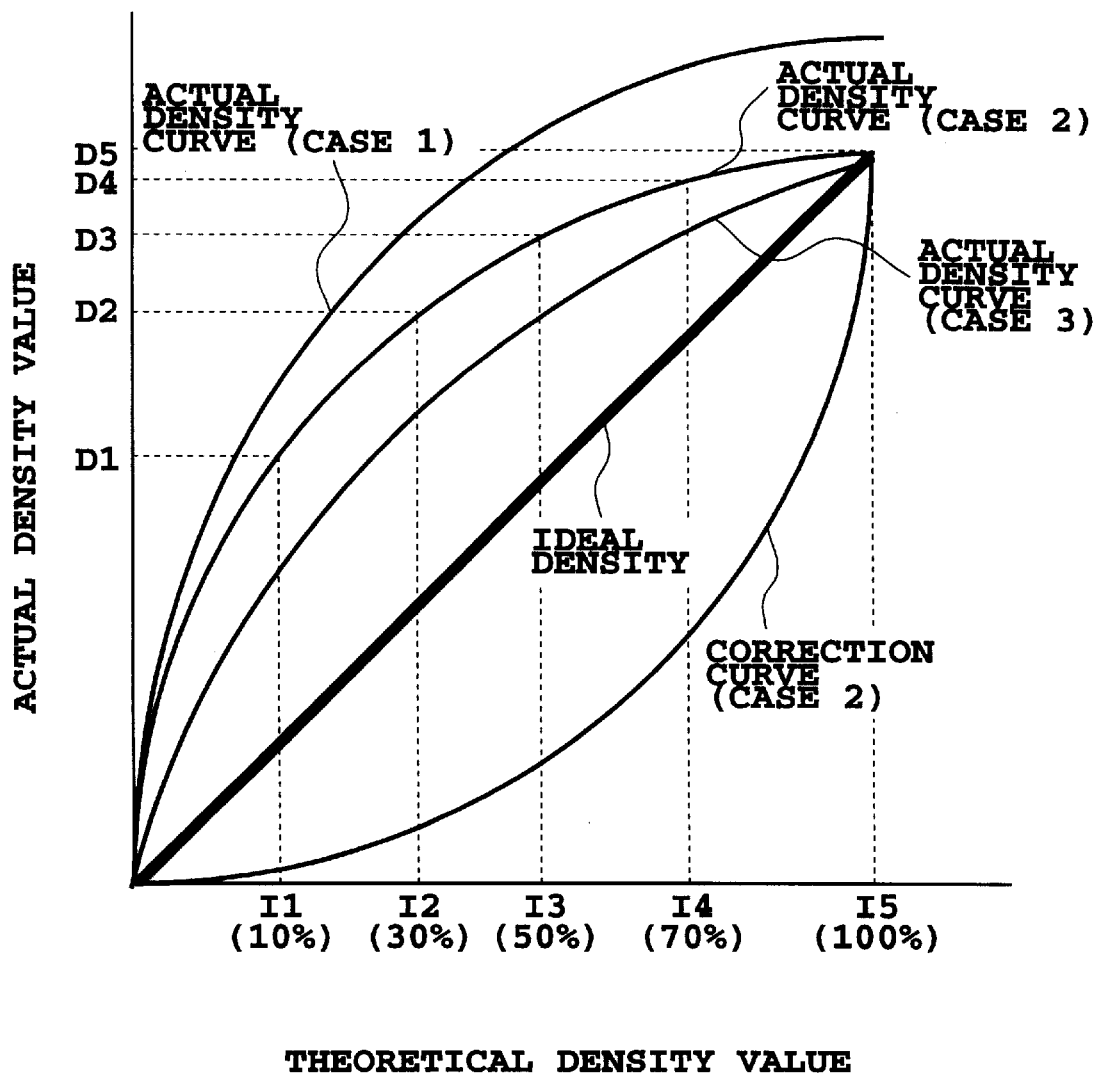
FIG. 14 is an illustration showing a relationship between a logical density value and an actual density value of the printer.

FIG. 14 is an illustration showing a γ-curve representative of a relationship between the theoretical density value and the actual density value of the printer. Normally, the density value transmitted from the host to the printer, namely, the theoretical density value and the actual density value upon formation of a visual image by the printer do not match to each other strictly. This difference becomes larger depending upon variation of environment and electrical and mechanical factors. In addition, there is an individual difference in the actual density curve at each individual printer. The actual density curve is further differentiated depending upon use environment and use condition.

In FIG. 14, three kinds (case 1 to 3) of the actual density curves are shown. The calibration information shown in FIG. 13 is for the case 2. In FIG. 14, the horizontal axis represents the theoretical density value, namely the density value of the printing input in the printer, and the vertical axis represents the actual density value by its output. In the case of the shown embodiment, a curve formed by plotting the actual density values with respect to the theoretical density values becomes an upwardly projecting curve, in which the actual density becomes large relative to the theoretical density value at the intermediate density portion of the visual image. In order to correct the actual density values into an ideal density line, namely into a straight line ascending toward right with a gradient of 45°, the actual density values are corrected with values expressed by a concave curve relative to the theoretical density value. In FIG. 14, a correction curve expressed by the concave curve is the correction curve for the actual density curve of the case 2. The relationship represented by the correction curve (γ-curve) is stored in RAM as the correction table.

FIG. 15 is a diagrammatic illustration showing the correction table. In the case that a theoretical density value (output value) from the host 10 is output, the density value actually formed by the printer on a basis of the output value is an input value obtained as the calibration information from the printer. This becomes the actual density value. Then, the density correction value can be derived by division of the theoretical density value by the input density value.

Figure 3:
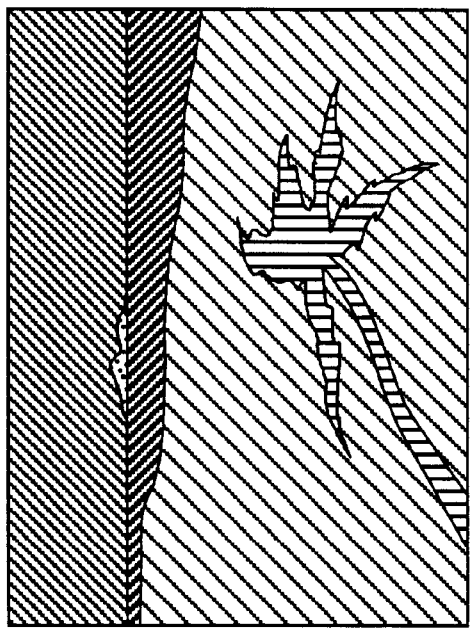
FIG. 3 is an illustration showing an example of a print output where degradation of print quality is caused when printing is performed by the prior art.
Figure 3:
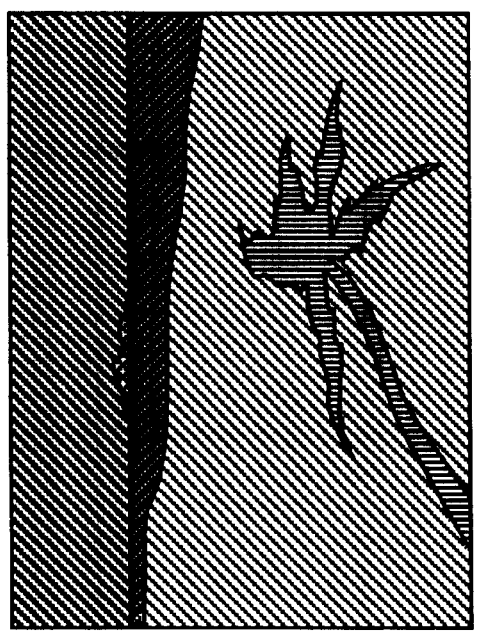

Again, with reference to FIG. 8, the control portion 1010 generates the printing job (binarized data) by using the correction table and the printing data stored in RAM of the storage portion 1030, to store in RAM of the storage portion 1030 (step S13). Generation of the printing job by using the correction table is similar to that performed conventionally, in which γ-correction is performed by using the correction table with respect to the density data for each pixel as the printing data, and subsequently, binarization is performed. At this time, the printing job (job No., n which is the initially one) for one page as the drawing data for obtaining an output image such as an image shown in FIG. 3.

Furthermore, at step S14, the control portion 1010 makes reference to the job division table (see FIG. 12) stored in the storage portion 1030 to obtain information of the number of copies to print for the printing job which has the job No. n (initially n=1). Then, the control portion 1010 converts the printing number information into a format representing the number of copies in PDL, adds the converted information to the printing job of job No. n (initially n=1) stored in the storage portion 1030, and stores them in the storage portion 1030. By this arrangement, since the printing number information of the job No. n (n=1) in the job division table shown in FIG. 12 is two hundreds, two hundred copies is set as number of copies. At this time, the printing job (initially n=1, first to two hundredth copies) shown in FIG. 6 is generated.

Next, the control portion 1010 transfers the printing job n stored in the storage portion 1030 to the control portion 2010 of the printer via the connecting portion 1020 and the connecting portion 2020 (step S15). In response to this, the control portion 2010 processes the printing job to perform printing process for outputting the same data for two hundred copies. In this case, since the calibration is performed upon setting the printing job for two hundred copies to be printed, two hundreds copies of print can be obtained with uniform printing quality without causing degradation of the quality.

Figure 4:
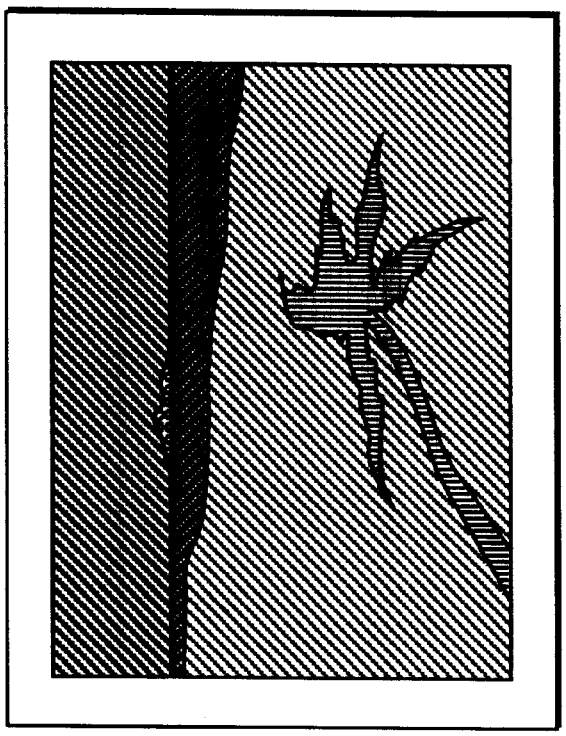
FIG. 4 is an illustration showing an example of a print output not causing degradation of quality in the case where printing is performed in an embodiment of a printing system according to the present invention.
Figure 4:
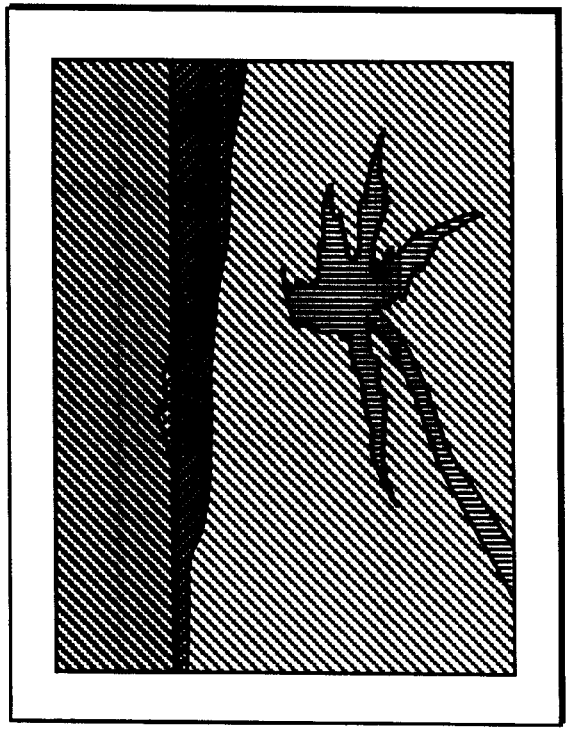

Subsequently, the control portion 1010 adds one to n (step S16). Then, process returns to step S10 to repeat subsequent process until n becomes greater than the value of K which is 5 in the shown case. As a result, the second printing job (job No. 2 of the job division table of FIG. 12) to the fifth printing job (job No. 5 of the job division table of FIG. 12) are respectively generated and transferred to the printer for performing respective printing process. Then, finally, as shown in FIG. 4, the first to nine hundred copies can be output with uniform quality without varying the printing quality.

On the other hand, when n becomes 6 and thus judgement is made that n is greater than K at step S10, the shown process goes to END.

Second Embodiment

A second embodiment of the present invention relates to obtaining of an execution timing information of the calibration.

In the foregoing first embodiment, the execution timing information is stored as a standard value in RAM of the storage portion 1030 of the host, and is used. However, it may be possible to vary the execution timing information adapted to use environment of the user and data, instead of using the fixed value. By this arrangement, concerning execution timing of the calibration, timing setting with high flexibility can be done.

In the shown embodiment, a mechanism permitting the user to vary the execution timing information on a basis of a reference value, is provided. For example, while the printer is relatively new, the calibration is performed at relatively long intervals (relatively large number of copies of printing). When the printer or the parts thereof becomes relatively old, the calibration is performed at relatively short interval (relatively small number of copies of printing). Further, it is also possible to perform setting of the timing to perform the calibration depending upon the printing data which the user wants to output. For example, when a large number of characters is contained as a structure of the printing data, the calibration is performed at relatively long intervals, and the calibration is performed at relatively short intervals when color bit map or graphics are extensively used.

Figure 16A:
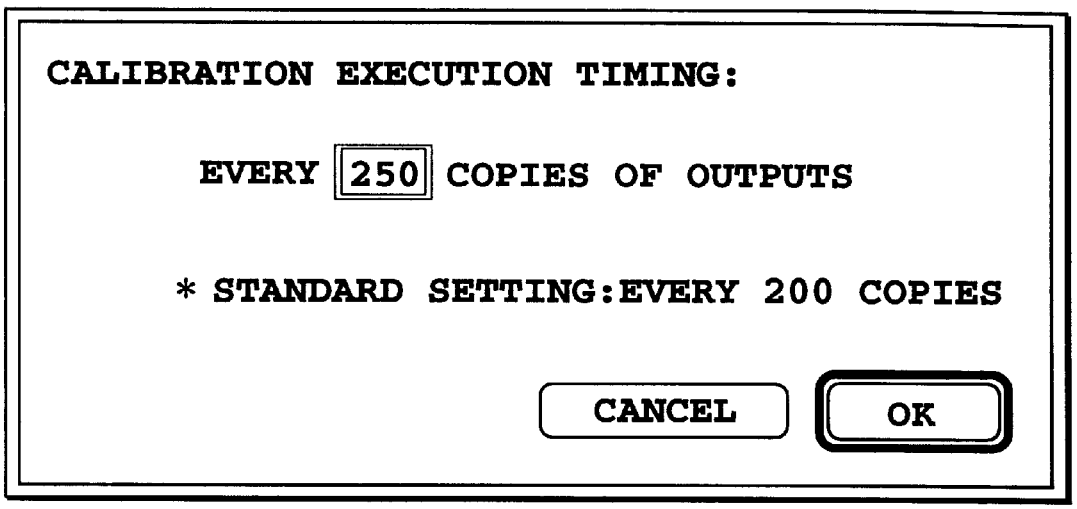
FIGS. 16A and 16B are illustrations showing examples of a display of a user interface in an embodiment of the present invention.

In particular, after execution of step S6 shown in FIG. 7, the control portion 1010 of the host displays a dialog shown in FIG. 16A on a display portion 1040 of the host 10. When displaying the dialog, a standard value of the execution timing information preliminarily obtained from the printer-side and stored in RAM of the storage portion 1030, is displayed as a reference value. As set forth above, the user judges of the printing environment whereby the desired execution timing information (number of copies for print) is then set through the input portion 1070 of the host 10. By this arrangement, the calibration can be performed so that the calibration is adapted to an actual user environment on a basis of the reference value to apply the first embodiment of the automatic calibration to widen flexibility in setting of the calibration timing.

Figure 16B:
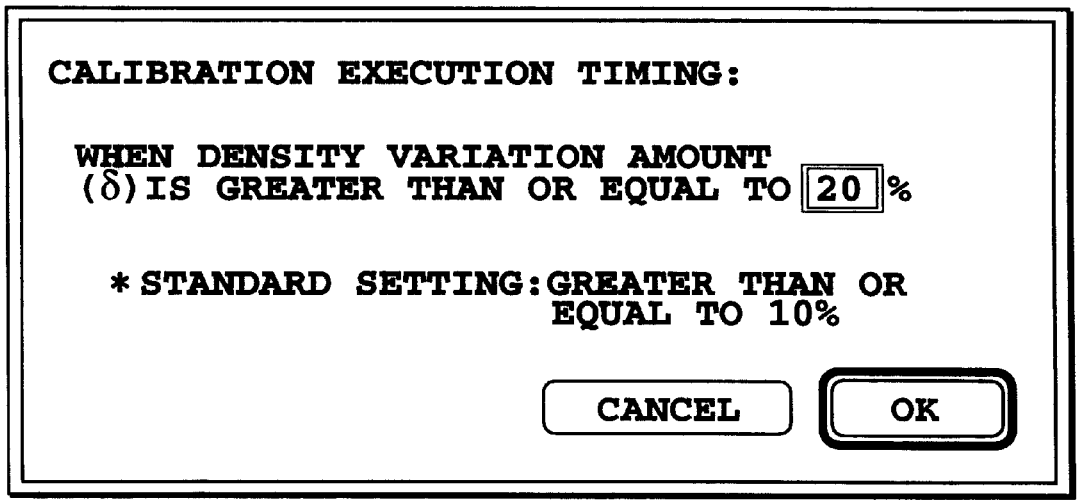

The foregoing disclosure has been given using the number of copies of printing as the execution timing information. However, as shown in FIG. 16B, the same effect can be obtained even by setting of a variation rate of the printing density. In this case, upon generation of the job division table at step S7, the number of divisions of the printing job can be determined in relation to the preliminarily derived relation between a printing amount and the variation ratio of the printing density. In addition, as shown in FIG. 17, it is also possible to provide a condition where the number of papers to output and the variation ratio of the foregoing density are combined. Then, as shown in FIG. 17, a history up to the present is displayed to enable user to efficiently set the execution timing.

Third Embodiment

As another example of the execution timing of the calibration, it is possible that the printer-side checks its own condition upon execution of the calibration, and obtains execution timing information. The job division table is generated by using thus obtained execution timing information. The condition checked in such printer may be an accumulated use period of the printer, temperature of the environment of the printer or the like. Then, on the printer-side, the number of copies for determining the execution timings are preliminarily set for respective of levels of the above-stated conditions. When information for the execution timing is demanded from the host-side, the number of copies thus set can be outputted depending upon the condition, such as an accumulated use period or the like.

More particularly, the control portion 2010 of the printer regularly checks its own condition set forth above to store the execution timing information depending upon the detected condition in RAM of the storage device 2030 of the printer. The control portion 1010 of the host makes reference to the number of copies of the execution timing information stored in RAM of the storage device 2030 to generate the job division table at step S7 on a basis of this information.. By this arrangement, division of a job can be done constantly and efficiently adapting to the condition of the printer irrespective of the individual difference of the printer and use condition.

Fourth Embodiment

A further embodiment of a setting method of the execution timing of the calibration will be explained. The shown embodiment is characterized by optimization of the execution timing of the calibration depending upon the number of copies to output in the printing process.

For example, in the first embodiment, the printing job is divided into sets of two hundred copies. Accordingly, when executing a job for printing two hundred and ten copies, the job is divided into jobs for printing two hundred copies and ten copies so that calibration is to be performed at a timing where printing of two hundred copies is completed.

In contrast to this, the number of times of calibrations needed to be performed during the printing job is derived on a basis of the preliminarily set number of copies of printing (for example, two hundred copies in the first embodiment).

More specifically, printing job is divided in such a manner that the number of copies to be printed can be uniformly divided on a basis of the preliminarily set number of copies. This process can be performed by dividing the job by a number derived by adding one to necessary number n of calibrations calculated as set forth above. For example, when the job for printing two hundred and ten copies is commanded, judgment is made that one time (n=1) calibration is necessary in the printing job on a basis of the preliminarily set number of copies (two hundred). Then, on the basis of the result of judgment, the printing job for two hundred and ten copies is divided into jobs for printing one hundred and five, respectively by dividing printing job by 2 (n+1).

By the shown embodiment, the calibration can take place at uniform timing to maintain color reproduction ability with respect to divided jobs better.

It should be noted that, similarly to another embodiment set forth above, the preliminarily set number of copies to be printed can be varied on the basis of a command input by the user, and the necessary number of calibrations can also be derived depending upon the density variation amount.

Fifth Embodiment

The fifth embodiment relates to a printing job derived by converting the printing data into the PDL.

More specifically, in certain transfer modes of the printing data, there is some mode, in which the calibration cannot be executed in the printer which processes one printing job. As set forth above, when the host outputs the printing data in the PDL format, the control portion cannot execute calibration until one job (for example, outputting of nine hundred copies) even when a state variation is caused in the printer. Therefore, despite the fact that the control portion of the printer has a function to perform the calibration, such function cannot be used effectively inherently causing degradation of the printing quality.

In the shown embodiment, when the printing data is transmitted to the printer as the printing job converted into PDL, degradation of the printing quality can be avoided by dividing the job under the predetermined condition.

In particular, in place of steps S11 to S13 in FIG. 8, a process for converting the printing data into the PDL data (drawing data) is provided. In this case, in case of the example shown in FIG. 6, the first printing job to the fifth printing job are sequentially transferred to the printer as each one job is described in the PDL format. Then, in the control portion of the printer, at a timing of finishing of the first printing job, the calibration is executed. Subsequently, the printing process of the second printing job and subsequent printing jobs are performed with performing the calibration in advance of respective printing jobs. By this arrangement, since the calibration is always executed before a divided printing job, when the printing job converted into the PDL format is transmitted to the printer, it becomes possible to maintain the quality of output high.

It should be noted that those disclosed as one embodiment in the foregoing embodiments may be replaced with those listed below.

Namely, the printer can be replaced with a block, a copy machine, a facsimile machine and so forth. The host can be replaced with a personal computer, a work station, mini computer and the like. The control portion may be replaced with a software, ROM, RAM and the like. The connecting portion may be replaced with a serial interface board, a parallel interface board, a network interface board and the like. The storage portion can be replaced with a memory, magnetic disk drive, a magneto-optic disk drive, a magnetic tape device and the like. The printing portion may be a laser beam type, a bubble-jet type, LED type, thermal-transfer type printer. The display portion can be a CRT, a liquid crystal and the like. An input portion is a keyboard, a mouse, track ball and the like. The medium reading portion may be an FD device, a MO device, a CD-ROM device, an IC memory card device and the like. The storage medium may be an FD, a MO, a CD-ROM, an IC memory card and the like.

Other Embodiment

The present invention is applicable not only for a system constituted of a plurality of devices (such as a host computer, an interface device, a reader, a printer and the like) but also to other devices (such as copy machine, facsimile machine).

Further, a system, in which program codes of software for realizing the foregoing functions in the embodiments are supplied to a computer within the machine or the system connected to various devices in order to operate various devices for realizing the function of the foregoing embodiment, and the various devices are operated by the programs stored in the computer (CPU or MPU) in the system or machine, is encompassed within the scope of the present invention.

Also, in this case, the program codes of the software per se performs the functions of the foregoing embodiment. Therefore, the program codes per se, and means for supplying the program codes to the computer, such as a storage medium storing, are encompassed within the scope of the present invention.

As the storage medium storing the program codes. floppy disk, a hard disk, an optical disk, a CD-ROM, a magnetic tape, a non-volatile memory card, ROM and the like can be used, for example.

In addition, the function of the foregoing embodiments is realized not only by executing the program codes supplied to the computer but also by cooperatively executing the program codes together with an OS (operating system) active in the computer or other application software. Such system is also encompassed within the scope of the present invention.

As set forth above, by respective embodiments set forth above, calibration can be performed at an appropriate timing.

In particular, the printing job to be transferred from the host unit to the printing apparatus is divided into a plurality of divided jobs and transferred sequentially. Every time of transfer of the divided job, calibration of the correction data is performed with the most recent calibration information. Therefore, when a large amount of printing is performed for the same data, calibration can be performed for every divided job during printing.

As a result, even when a large number of copies is printed for the same data, degradation of printing quality can be prevented.

The present invention has been described in detail with respect to preferred embodiments, and it will now be apparent from the foregoing to those skilled in the art that changes and modifications may be made without departing from the invention in its broader aspect, and it is the invention, therefore, in the apparent claims to cover all such changes and modifications as fall within the true spirit of the invention.

What is claimed is:

1. A printing method of performing printing by using a printing apparatus connected to a host unit, on a basis of a printing data corrected by a correction data, said method comprising the steps of:

dividing a printing job containing printing data into a plurality of divided jobs on a basis of a predetermined printing amount in said printing apparatus and sequentially transferring said plurality of divided jobs from the host unit to the printing apparatus;

updating the correction data for each transferring of a divided job, on a basis of a most recent calibration information which said printing apparatus has;

correcting the printing data of each divided job on a basis of the updated correction data; and performing printing of each divided job on a basis of the corrected printing data.

2. A printing method as claimed in claim 1, wherein the printing data corrected at the step of correcting the printing data is included in each divided job transferred to the printing apparatus by step of dividing and transferring said job.

3. A printing method as claimed in claim 1, wherein said step of updating the correction data and said step of correcting the printing data are executed in the printing apparatus.

4. A printing method as claimed in claim 1, wherein the printing apparatus obtains and holds the calibration information at a timing independent of a process in the host unit.

5. A printing method as claimed in claim 4, wherein the calibration information is an actual density value obtained by measuring a result of printing on a basis of a theoretical density value in the printing apparatus.

6. A printing method as claimed in claim 5, wherein the correction data is implemented in a form of a table defining correspondence between the theoretical density value and a correction amount of said theoretical density value.

7. A printing method as claimed in claim 1, wherein the predetermined printing amount in said printing apparatus is a number of copies to be printed.

8. A printing method as claimed in claim 1, wherein the predetermined printing amount in said printing apparatus is variable.

9. A printing method as claimed in claim 8, wherein the predetermined printing amount can be set by a user of the printing apparatus.

10. A printing method as claimed in claim 8, wherein the predetermined printing amount is set as number of copies to be printed depending upon a condition of said printing apparatus.

11. A printing method as claimed in claim 8, wherein the predetermined printing amount is set as a number of copies derived by dividing overall number of copies of print of the printing job by a number derived by adding one to the number of times of calibration which is derived on a basis of a preliminarily set number of copies.

12. An image processing method used in an image processing portion which performs a color correction of image data depending upon a set color correction condition to output the image data to an image output portion, said method comprising the steps of:

inputting state information from the image output portion;

setting calibration execution timing on a basis of the state information;

performing a calibration process in the image output portion at said set execution timing; and setting the color correction condition by inputting result of said calibration process from the image output portion.

13. An image processing method comprising the steps of:

inputting an image output job;

dividing the image output job into a plurality of image output jobs depending upon a number of copies of image outputs; and designating a calibration to an image output portion in response to finishing of performing each divided image output job.

14. An image processing method comprising the steps of:

setting an interval of execution of calibrations;

designating execution of calibration process for an image output portion depending upon a calibration execution interval in execution of calibrations; and displaying a state variation of the image output portion.

15. An image processing method as claimed in claim 14, wherein setting of the calibration execution interval is performed on a basis of manual command of an user.

16. An image processing method as claimed in claim 14, wherein said setting of the interval of execution of the calibration can be set for every image outputting job.

17. A storage medium storing a program readable by an information processing apparatus, said program being an image processing program used in an image processing portion which performs a color correction of image data depending upon a set color correction condition to output the image data to an image output portion, said method comprising the steps of:

inputting state information from the image output portion;

setting calibration execution timing on a basis of the state information;

performing a calibration process in the image output portion at said set execution timing; and setting the color correction condition by inputting result of said calibration process from the image output portion.

18. A storage medium storing a program readable by an information processing apparatus, wherein processing of said program comprises the steps of:

inputting an image output job;

dividing the image output job into a plurality of image output jobs depending upon number of copies of image outputs; and designating a calibration to an image output portion in response to finishing of performing each divided image output job.

19. A storage medium storing a program readable by an information processing apparatus, processing of said program comprising the steps of:

setting an interval of execution of calibrations;

designating execution of calibration process for an image output portion depending upon a calibration execution interval in execution of calibrations; and displaying a state variation of the image output portion.

20. An information processing system having a host unit and making a printing apparatus connected to the host unit perform printing on a basis of printing data corrected by correction data, said system comprising:

job dividing means for dividing a printing job containing printing data into a plurality of divided jobs on a bass of a predetermined printing amount in said printing apparatus and for sequentially transferring said divided jobs from the host unit to said printing apparatus;

calibration means for updating the correction data for each transferring of divided job, on a basis of the most recent calibration information which said printing apparatus has; and printing data correcting means for correcting the printing data of each divided job on a basis of the updated correction data by said calibration means.

21. An image processing method of performing image processing for an image forming section which performs a calibration for a correction condition, based on a predetermined condition, said method comprising the steps of:

inputting a print job; and dividing the print job based on a number of sheets to be printed specified in the print job and the predetermined condition, wherein the calibration is performed after completion of a divided job.

22. An image processing method as claimed in claim 21, further comprising setting the predetermined condition based on designation by a user.

23. An image processing method as claimed in claim 21, further comprising setting the predetermined condition in accordance with a condition of the image forming section.

24. An image processing apparatus for performing image processing for an image forming section which performs a calibration for a correction condition, based on a predetermined condition, said apparatus comprising:

input means for inputting a print job; and dividing means for dividing the print job based on a number of sheets to be printed specified in the print job and the predetermined condition, wherein the calibration is performed after completion of a divided job.

25. A storage medium storing a program readable by an information processing apparatus, said program including an image processing process of performing image processing for an image forming section which performs a calibration for a correction condition, based on a predetermined condition, said process comprising the steps of:

inputting a print job; and dividing the print job based on a number of sheets to be printed specified in the print job and the predetermined condition, wherein the calibration is performed after completion of a divided job.

* * * * *

UNITED STATES PATENT AND TRADEMARK OFFICE
CERTIFICATE OF CORRECTION

PATENT NO. : 6,160,968
DATED : December 12, 2000
INVENTOR(S) : Noda

It is certified that error appears in the above-identified patent and that said Letters Patent is hereby corrected as shown below:

Title page, item [57],
Abstract,
Line 3, "jobs a" should read -- jobs and a --.

Column 2,
Line 9, "And a" should read -- A --.
Line 10, "an" should be deleted.

Column 6,
Line 42, "the" (first occurrence) should be deleted.

Column 7,
Line 26, "falls" should read -- fall --.
Line 42, "in" should read -- to a --.

Column 11,
Line 1, "of" should be deleted.
Line 45, "information.." should read -- information. --.

Column 13,
Line 57, "invention," should read -- intention, --.
Line 58, "in the apparent claims to" should read -- that the appended claims --.

Column 15,
Line 12, "an" should read -- a --.
Line 54, "correction" should read -- correcting --.

UNITED STATES PATENT AND TRADEMARK OFFICE
CERTIFICATE OF CORRECTION

PATENT NO. : 6,160,968
DATED : December 12, 2000
INVENTOR(S) : Noda

It is certified that error appears in the above-identified patent and that said Letters Patent is hereby corrected as shown below:

Column 16,
Line 2, "bass" should read -- basis --.

Signed and Sealed this

Sixteenth Day of October, 2001

Attest:

Nicholas P. Godici

NICHOLAS P. GODICI
Acting Director of the United States Patent and Trademark Office Attesting Officer